Patented June 13, 1933

1,913,953

UNITED STATES PATENT OFFICE

RICHARD SAMUEL PRENDERGAST AND FRED PEARSON, OF LONDON, ENGLAND

LUBRICANT

No Drawing. Application filed June 5, 1929, Serial No. 368,733, and in Great Britain September 22, 1928.

This invention relates to lubricants for use with parts of machinery subject to friction or to rapidly varying local pressure, such for example as gear wheels, roller bearings or parts of friction gears.

More especially the invention relates to a liquid lubricant especially adapted for high speed machinery and arranged to coat one or both of two frictionally engaged surfaces adherently with a metal or metallic compound adapted to greatly reduce the friction between the parts.

We are aware that metals or metallic compounds have been mixed with oleaginous material to make a thick pasty lubricant such as is suitable for use on slow speed machinery but such thick pasty lubricants, consisting as they do of a very high percentage of the metal or metallic compound and a correspondingly low percentage of oil or grease, are utterly unfit for use on high speed machinery as a lubricant and, on the machinery in which they are used fail to properly coat the friction surfaces.

It is well known that acid will attack and corrode metallic surfaces and that acid acts more rapidly when hot than cold. In lubricants such acid may be present as a result of its employment in the refining process and the failure to remove all traces thereof after refining or it may result from the oxidation of the oil or grease used in the lubricant. By providing a coating on the friction surfaces of a metal or proper metallic compound such friction surfaces are protected from attack by acid and remain smooth and uncorroded.

It is a well known fact that a good lubricant should possess a minimum of cohesion among its own particles and to this end any content of metal or metallic compound should be in such condition, preferably colloidal, as to eliminate, as far as possible any cohesion between any of the particles of the lubricant.

It has been found that if zinc oxide be mixed with a suitable oil, such as a non-volatile pure mineral oil, in the proportions by weight of not over fifty percent of the oxide and not less than fifty percent of the oil, a liquid lubricant is produced which, when used in high speed machinery, will cause a protective coating to be formed on the friction surfaces. Preferably the mixtures should be colloidal in its nature.

Metallic zinc may be used in place of the zinc oxide and other zinc compounds may also be used under the same conditions.

For the purposes of this invention the metallic zinc and zinc compounds are each to be understood as covered by the term "zinciferous body".

We claim:

1. A lubricating compound for high speed bearings consisting of a mixture of substantially non-volatile mineral oil and zinc oxide in such proportions as to form a liquid mass, the amount of said zinc oxide by weight being substantially fifty percent of the mixture so as to form a protective metallic coating on the friction surfaces are protected from attack 2. A lubricating compound for high speed bearings consisting of a mixture of non-volatile mineral oil and zinc oxide in the colloidal state in such proportions as to form a liquid mass, the amount of zinc oxide by weight being substantially fifty percent of the mixture so as to form a protective coating on the friction surfaces of the bearings.

In testimony whereof we have hereunto set our hands.

RICHARD SAMUEL PRENDERGAST.
FRED PEARSON.

CERTIFICATE OF CORRECTION.

Patent No. 1,913,953.                                             June 13, 1933.

RICHARD SAMUEL PRENDERGAST, ET AL.

It is hereby certified that error appears in the printed specification of the above numbered patent requiring correction as follows: Page 1, line 69, claim 1, strike out the words "surfaces are protected from attack" and insert instead "surface of the bearings."; and that the said Letters Patent should be read with this correction therein that the same may conform to the record of the case in the Patent Office.

Signed and sealed this 22nd day of August, A. D. 1933.

M. J. Moore.

(Seal)                               Acting Commissioner of Patents.